United States Patent [19]

Vanderlinde et al.

[11] Patent Number: 4,605,120

[45] Date of Patent: Aug. 12, 1986

[54] SHAFT DRIVEN ACCUMULATION CONVEYOR ARRANGEMENT

[75] Inventors: Leendert A. Vanderlinde, Kansas City, Mo.; Byron T. Collier, Overland Park, Kans.

[73] Assignee: Mid-West Conveyor Company, Inc., Kansas City, Kans.

[21] Appl. No.: 555,948

[22] Filed: Nov. 29, 1983

[51] Int. Cl.⁴ ............................................. B65G 13/06
[52] U.S. Cl. ..................................................... 198/781
[58] Field of Search ........................ 198/781, 460, 791

[56] References Cited

U.S. PATENT DOCUMENTS

| | | | |
|---|---|---|---|
| 3,066,788 | 12/1962 | Christiansen | 198/781 |
| 3,122,232 | 2/1964 | Burt | 198/781 |
| 3,136,406 | 6/1964 | De Good et al. | 198/781 |
| 3,285,391 | 11/1966 | Fix | 198/781 |
| 3,400,806 | 9/1968 | Leach | 198/781 |
| 3,416,642 | 12/1968 | Muller | 198/781 |
| 3,513,960 | 5/1970 | Adams | 198/781 |
| 3,537,568 | 11/1970 | Leach | 198/781 |
| 3,549,002 | 12/1970 | Leach | 198/781 |
| 3,568,818 | 3/1971 | Hanson | 198/781 |
| 3,589,496 | 6/1971 | Leach | 198/781 |
| 3,610,406 | 10/1971 | Fleischauer | 198/781 |
| 3,650,375 | 3/1972 | Fleischauer et al. | 198/789 |
| 3,650,376 | 3/1972 | Burgis et al. | 198/781 |
| 3,672,486 | 6/1972 | Kennedy et al. | 198/791 |
| 3,696,912 | 10/1972 | Fleischauer et al. | 198/781 |
| 3,729,088 | 4/1973 | Stein et al. | 198/781 |
| 3,730,330 | 5/1973 | De Good | 198/781 |
| 3,840,110 | 10/1974 | Molt | 198/781 |
| 3,951,255 | 4/1976 | Shuttleworth et al. | 198/781 |
| 3,960,262 | 6/1976 | Henig | 198/781 |
| 3,961,700 | 6/1976 | Fleischauer | 198/789 |
| 4,042,101 | 8/1977 | Krammer et al. | 198/781 |
| 4,096,942 | 6/1978 | Shepherd | 198/781 |
| 4,108,304 | 8/1978 | McKnight | 198/781 |
| 4,111,087 | 9/1978 | Pankratz et al. | 198/781 |
| 4,164,998 | 8/1979 | De Good et al. | 198/781 |
| 4,190,146 | 2/1980 | Knuchel | 198/460 |
| 4,196,312 | 4/1980 | De Good et al. | 198/781 |
| 4,215,775 | 8/1980 | Gebhardt et al. | 198/781 |
| 4,223,780 | 9/1980 | Saur | 198/781 |
| 4,278,166 | 7/1981 | Pirro, Jr. | 198/781 |
| 4,291,796 | 9/1981 | Gebhardt | 198/781 |
| 4,362,238 | 12/1982 | Rivette | 198/781 |

FOREIGN PATENT DOCUMENTS

932287 8/1973 Canada ............................... 198/781

Primary Examiner—Joseph E. Valenza
Assistant Examiner—Kyle E. Shane
Attorney, Agent, or Firm—Litman, Day and McMahon

[57] ABSTRACT

A line shaft driven conveyor includes a right angle drive unit in each of a plurality of accumulation zones. A clutch in each zone couples between the right angle unit and a belt and pulley arrangement which transfers drive from the clutch to the rollers in the zone. The clutch is controlled by a rotating collar which declutches when the collar is immobilized. A clutch control pawl in each zone is slidably mounted and is resiliently urged toward a stop position engaging and thus immobilizing the clutch control collar. A control rod extends between and is slidably engaged with the pawl of a zone and the pawls in the upstream and downstream zones adjacent thereto. Each rod has an abutment at each end for engagement with one of the pawls associated therewith in one direction of movement of the control rod. A sensor roller is positioned in each zone for engagement by an article in that zone and is connected with one of the rods associated with the pawl in that zone. The engagement of an article with the sensor roller of a zone causes the movement of the associated control rod in such a manner to decouple the line shaft from the rollers in that zone and moves an abutment on the other end of the rod away from the pawl in the next upstream zone to enable the decoupling of drive in the upstream zone when an article engages the sensor roller thereof.

10 Claims, 11 Drawing Figures

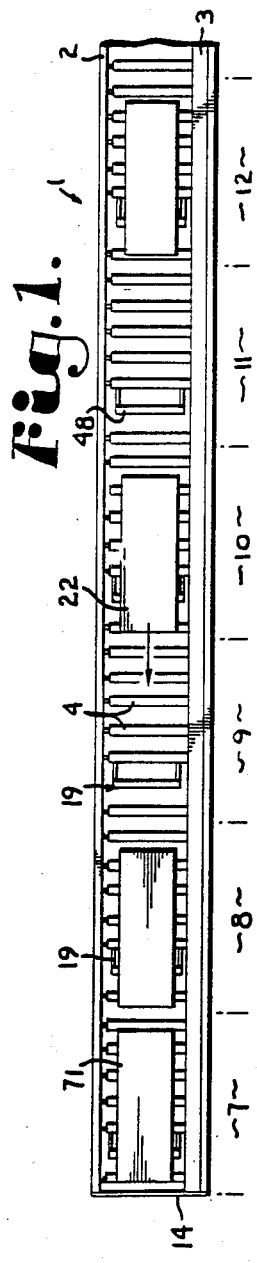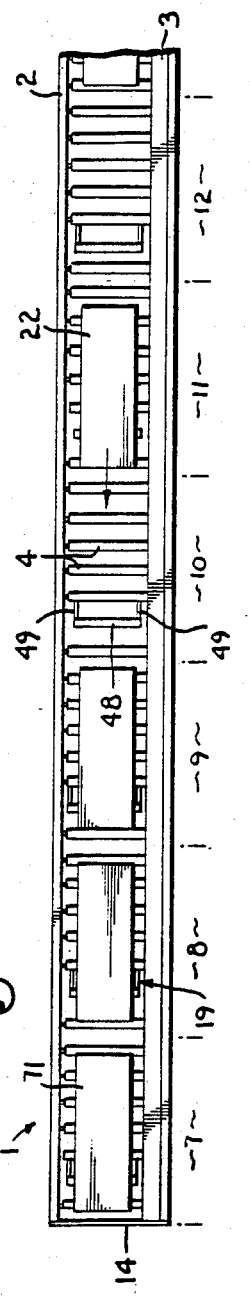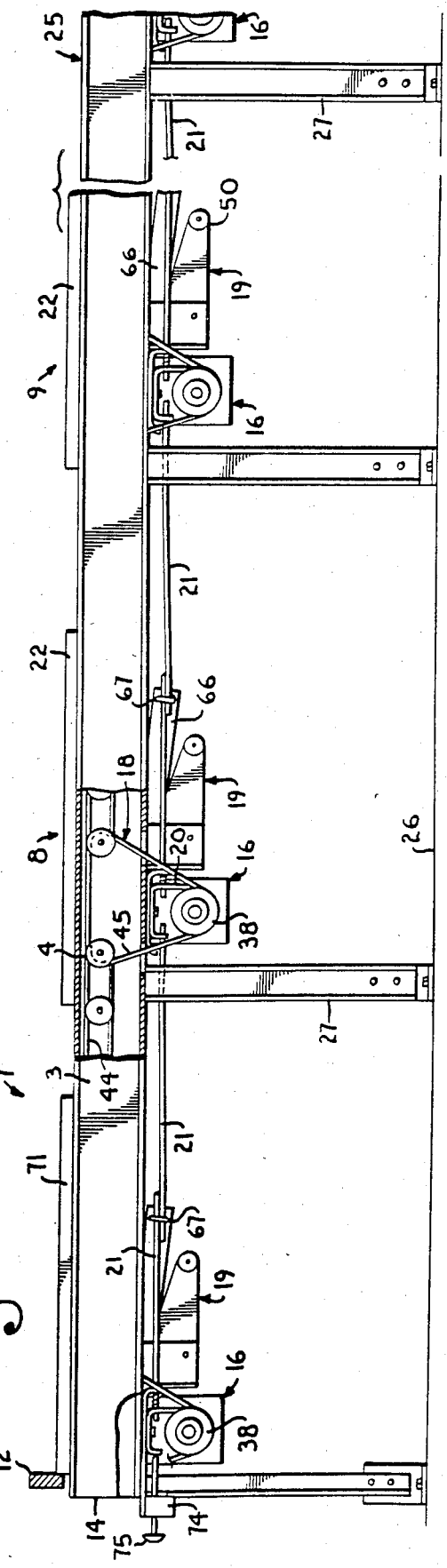

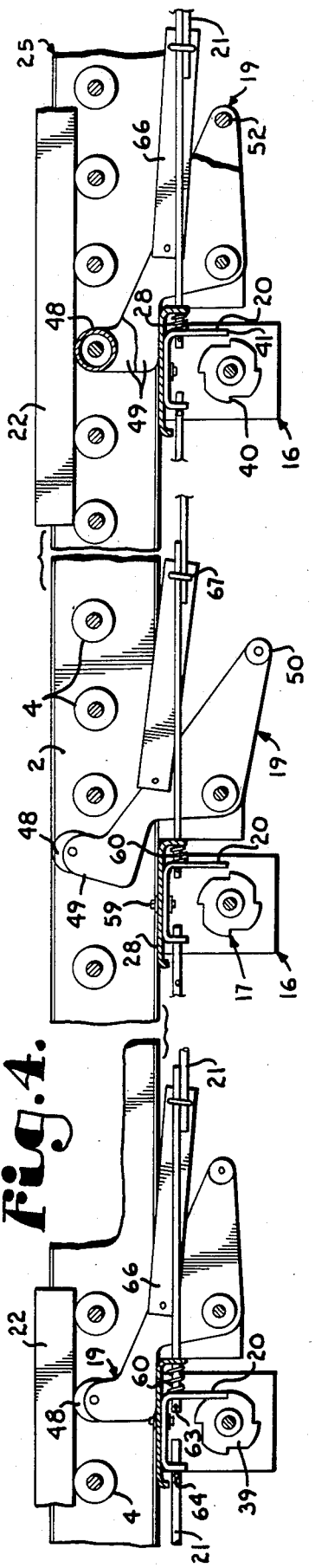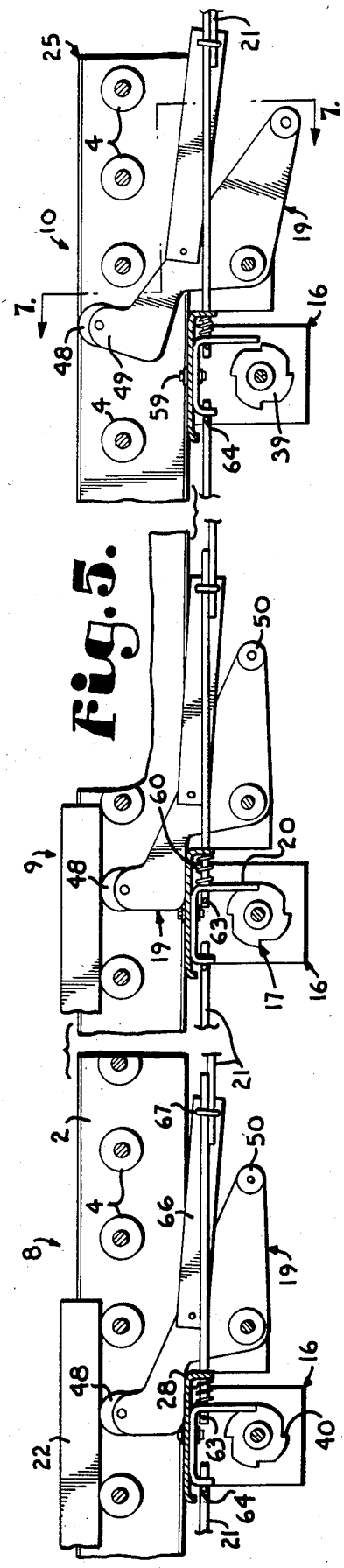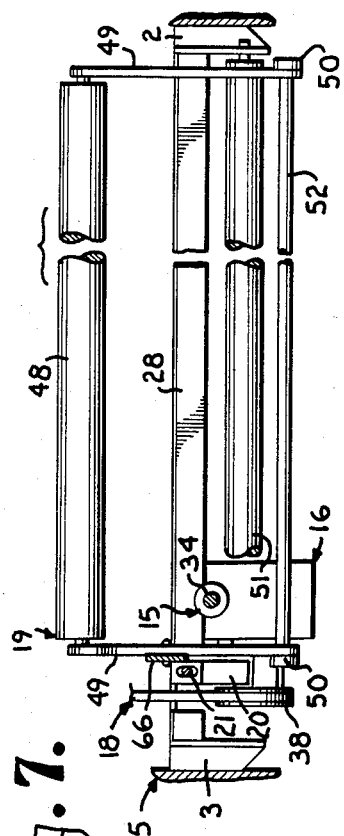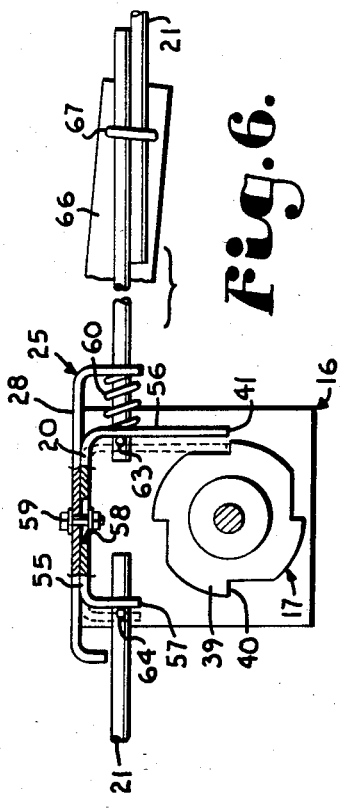

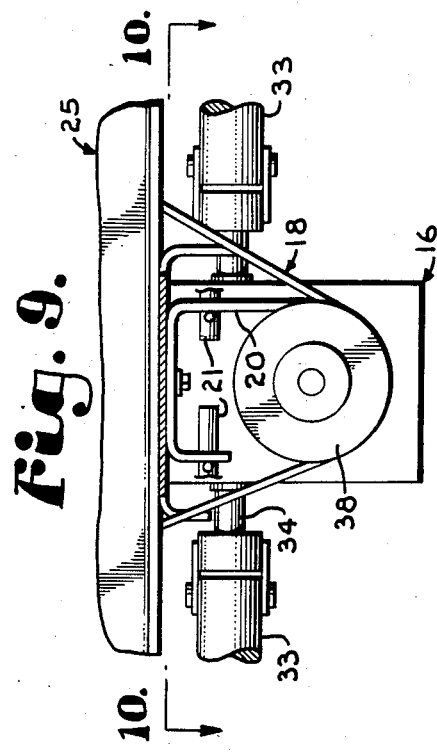
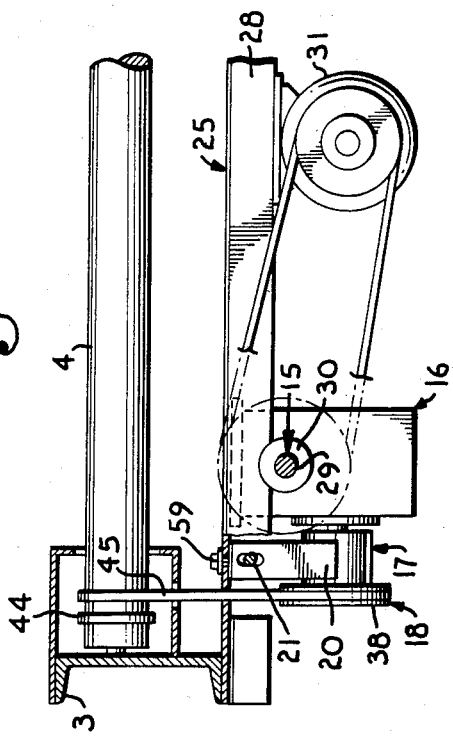
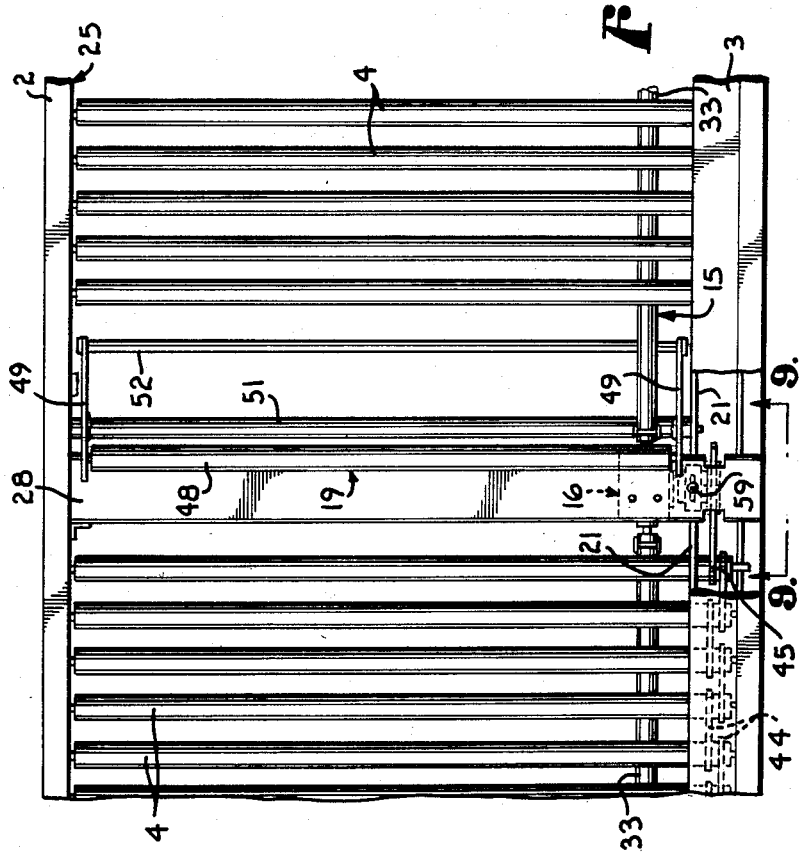

SHAFT DRIVEN ACCUMULATION CONVEYOR ARRANGEMENT

FIELD OF THE INVENTION

The present invention relates to accumulation conveyors and, more particularly, to such a conveyor including a two-stage accumulation control arrangement.

BACKGROUND OF THE INVENTION

In general, accumulation conveyors have been developed to regulate the flow of articles on conveyors. More specifically, accumulation conveyors are employed to allow a line of articles to be stopped on a powered conveyor without damage to the articles to allow processing or handling of the articles at a rate which is different from the rate of arrival of the articles on the section of the conveyor which has been stopped. For example, such conveyor techniques are often employed where the articles are offloaded from the conveyor in groups whereas the articles arrive at regular intervals of time. In practice, the line of articles is stopped by placing a barrier in the path of the lead article, and power is decoupled from the conveyor bed in the region where the articles are stopped. The great majority of accumulation conveyors devised heretofore have employed rollers driven by arrangements of either belts or chains engaged with a motor. Belts and chains are not as compact as might be desired since not only must the active (usually the top) run be accommodated but also the return run which in most cases does not engage any operating mechanisms of the conveyor. This requires space on the conveyor structure in excess of what is actually needed for operating the rollers. In addition, the belts are subject to stretching and wear while the chains although stretching less than belts are generally noisy.

Line shafts, that is, longitudinally extending conveyor drive shafts, have been employed on accumulation conveyors to address some of the problems associated with belts and chains. However, in most cases, the conveyor rollers are drivingly connected with a line shaft by individual endless belts, sometimes referred to as "O-rings". The result is a great multiplicity of such belts which have to be maintained. The replacement of such belts is very laborious because when a belt breaks, it is necessary to shift all the remaining belts toward the empty space before a belt is added. In the case of accumulation conveyors, an intermediate mechanism is required for control of the rollers of a zone, such as an intermediate shaft and a decoupling mechanism.

Accumulation conveyors have not always performed as would be expected. Normally, a sensor is positioned in each accumulation zone and is connected to a drive coupling mechanism in the previous or immediately upstream zone to deactivate the rollers in the previous zone when the first zone is occupied by an article to prevent a collision therewith by an oncoming article. Depending upon the position of the sensor in a zone, the weight of an article on the conveyor, the freewheeling ability of the rollers, and whether a brake is employed; an article entering a zone may or may not engage the sensor in the zone. The usual result is that unnecessary gaps are left in the line of accumulated articles. The gaps could be eliminated by connecting the article sensor in each zone to the decoupling mechanism in that zone. However, there would be no provision for starting up a line of articles in such an arrangement once the articles had been halted.

In order to more efficiently utilize accumulation conveyors by eliminating gaps while providing a start-up mechanism therefor, two-stage accumulation control was devised. On a two-stage accumulation conveyor, the drive to the rollers of a zone is decoupled when an article engages the article sensor of the zone, and the preceding zone is conditioned to decouple the drive therein when an article engages the sensor therein. The conditioning mechanism also serves as a start-up sensor such that when an article in a zone is disengaged from the sensor therein, the drive to the rollers in the next upstream zone is recoupled; and the process is repeated in an upstream direction for all the article occupied zones such that the line of articles is placed in motion.

SUMMARY OF THE INVENTION

The conveyor according to the present invention is a line shaft driven accumulation conveyor wherein the line shaft is connected to the rollers of each zone by a zone right angle gear unit. The drive decoupling mechanism in each zone is a clutch unit with an output shaft of the clutch connected to the rollers by a short endless belt or chain. The clutch is controlled by a rotating projection which causes decoupling of the clutch when the projection is prevented from rotating. The projection is immobilized by a sliding pawl which is resiliently urged toward the decouple or stop position. A control rod extends between each pawl and the pawl in the next upstream and downstream zones, except for the extreme downstream zone. The rods have abutments at each end for engagement with the respective pawl to move the pawl in a certain way or to allow the pawl to move in the desired way. Each zone includes an article sensor, such as a sensor roller, which senses the presence of an article in the zone. The article sensor is connected to one of the control rods associated with the pawl in the zone such that operation of the zone article sensor moves the rod thereby allowing the pawl in the zone to engage the projection of the zone clutch thereby deactivating the rollers in the zone. At the same time, the abutment on the other end of the rod is moved out of engagement with the pawl in the previous zone. This clears the way for the upstream pawl to move to its stop position when an article engages the sensor in the previous zone. When an article in a zone is removed or moved off the sensor therein, the rod connected to the sensor is moved in such a manner to push the pawl in the previous zone out of engagement with the clutch projection therein, whereby drive is recoupled in the previous zone.

OBJECTS OF THE INVENTION

The principal objects of the present invention are: to provide an improved accumulation conveyor arrangement; to provide such an arrangement including rollers which are driven by a longitudinally extending line shaft; to provide such an arrangement wherein the drive to the rollers in each accumulation zone is transmitted from the line shaft by a right angle gear drive unit; to provide such an arrangement which promotes denser packing of articles stopped on an accumulation conveyor section; to provide such an arrangement which employs two stage accumulation control; to provide such an arrangement wherein the engagement of a sensor of an accumulation zone by an article causes the deactivation of that zone and conditions apparatus in the next upstream zone to stop when an article engages the sensor therein; to provide such an arrangement which employs only mechanical members for the control of the accumulation zones; to provide such an arrangement which employs a clutch in each zone to selectively couple between the line shaft and the rollers in the zone, the clutch decoupling upon the immobilization of a rotating clutch control member on the clutch; to provide such an arrangement including a longitudinally sliding pawl member in each zone for immobilizing the clutch control member, the pawl being connected by control rods to the in-zone sensor, to the next downstream pawl, and to the next upstream pawl; to provide such an arrangement including a solenoid in the most downstream zone, the solenoid being associated with the pawl in the end zone for selective start-up of the halted articles; and to provide such an accumulation conveyor arrangement which is economical to manufacture, positive and durable in operation, and which is particularly well adapted for its intended purpose.

Other objects and advantages of the present invention will become apparent from the following description taken in connection with the accompanying drawings wherein are set forth, by way of illustration and example, certain embodiments of the present invention.

The drawings constitute a part of the specification, include an exemplary embodiment of the present invention, and illustrate various objects and advantages thereof.

BRIEF DESCRIPTION OF THE DRAWINGS

FIG. 1 is a diagrammatic top plan view of an accumulation conveyor according to the present invention and illustrates articles beginning to accumulate thereon.

FIG. 2 is a view similar to FIG. 1 and illustrates the articles in a later stage of accumulation.

FIG. 3 is a fragmentary side elevational view of the conveyor of the present invention with portions broken away to illustrate details of the drive mechanism for the accumulation zones.

FIG. 4 is a fragmentary longitudunal sectional view of the accumulation conveyor and illustrates the positions of components of the accumulation control mechanism with articles positioned on the conveyor as in FIG. 1.

FIG. 5 is a view similar to FIG. 4 and illustrates the accumulation control mechanisms with the articles positioned as in FIG. 2.

FIG. 6 is an enlarged fragmentary side elevational view illustrating details of the accumulation control mechanism according to the present invention.

FIG. 7 is an enlarged fragmentary transverse sectional view taken on line 7.—7. of FIG. 5 and illustrates details of the article sensor roller of each zone.

FIG. 8 is an enlarged fragmentary top plan view of a portion of the accumulation conveyor.

FIG. 9 is a further enlarged fragmentary side elevational view as seen from line 9.—9. and illustrates details of the connection of the line shaft to the right angle gear drive unit of a zone.

FIG. 10 is a fragmentary top plan view taken on line 10.—10. and illustrates the relationship of the line shaft, the gear unit, and the clutch of a zone.

FIG. 11 is a fragmentary transverse sectional view of the conveyor of the present invention and illustrates the connection of a motor to the line shaft of the conveyor.

DETAILED DESCRIPTION OF THE PREFERRED EMBODIMENTS

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail: The reference numeral 1 generally designates a line shaft driven two stage accumulation conveyor according to the present invention. The conveyor 1 includes side rails 2 and 3 with article supporting rollers 4 journaled between the rails 2 and 3. The conveyor 1 terminates in an accumulation section including a plurality of accumulation zones 7, 8, 9, 10, 11 and 12 spaced from a downstream end 14 of the conveyor. The article supporting rollers 4 in each accumulation zone are driven by a line shaft assembly 15 (FIG. 8) which extends along the conveyor. Drive is transmitted from the line shaft assembly 15 and the article supporting rollers 4 of each zone by a right angle gear unit 16, a clutch assembly 17, and a zone drive transfer assembly 18. Each zone includes an article sensor 19, a clutch control pawl 20, and a control rod 21 connected to the sensor of the zone and the pawl in the next upstream zone. Each control rod 21 has abutments at each end thereof for engagement with the associated pawl in one direction of movement of the pawl such that upon the engagement of an article 22 with the article sensor 19 of a zone, drive is decoupled in that zone and the mechanisms in the next upstream zone are conditioned to decouple the drive in the upstream zone when an article engages the article sensor in the upstream zone.

The illustrated conveyor 1 includes a conveyor frame 25 supported above a floor 26 by conveyor legs 27. The frame 25 includes cross members 28 joining the side rails 2 and 3. The line shaft assembly 15 includes a main drive shaft 29 (FIG. 11) supported in bearings 30 mounted on the frame 25. The drive shaft 29 is drivingly engaged with a conveyor motor 31 supported on the frame, such as an electric motor. The line shaft assembly 15 further includes a plurality of line shaft segments 33 which connect between the right angle gear units 16 of the zones. Each right angle gear unit 16 includes a thru or through shaft 34 which is mounted longitudinal to the frame 25 and a cross shaft 35 mounted transverse to the conveyor frame and the thru shaft 34. The cross shaft 35 and thru shaft 34 are interconnected by bevel gears (not shown). The thru shaft 34 in either the most upstream accumulation zone or most downstream zone on the conveyor 1 is connected to the main drive shaft 29; and the line shaft segments 33 are connected between the thru shafts 34 of the gear units of the accumulation zones such that a compact and positive roller propelling member is provided.

Referring to FIG. 10, each clutch assembly 17 includes an input member (not shown) connected to the cross shaft 35 of the associated right angle gear unit 16 and an output member connected to a drive pulley 38 which is a component of the zone drive transfer assembly 18. The clutch includes a rotary clutch control collar 39 having projections 40 thereon. The clutch assembly 17 is in a coupled condition when the clutch control collar 39 is free to rotate. When the clutch control collar 39 is immobilized, the clutch decouples whereby drive is not transferred from the cross shaft 35 to the rollers 4 of the associated zone. The clutch control collar 39 is immobilized by positioning the clutch control pawl member 20 of the associated zone such that an end 41 engages one of the projections 40 of the clutch control collar 39 (see FIG. 6).

Referring to FIGS. 3 and 8, the zone drive transfer assembly 18 of each zone includes the drive pulley 38 and means interconnecting the drive pulley 38 with selected rollers of the zone. As is illustrated in phantom in FIG. 8, each of the rollers 4 is connected to the rollers adjacent thereto by a roller belt 44 engaging respective roller pulleys (not shown) on the rollers 4. A zone drive belt 45 engages the drive pulley of the zone and at least one of the roller pulleys of the rollers 4 of the zone which are to be driven. It is not always necessary to power all the rollers of a zone. For example, if relatively light articles were to be handled on the conveyor 1, fewer rollers would be required to be driven than if relatively heavier articles were to be handled. Referring to FIGS. 4, 5, and 7, each article sensor 19 includes an article sensor roller 48 mounted between a pair of spaced apart sensor roller supports 49 which are pivotally connected to the conveyor side rails 2 and 3. The article sensor roller 48 is normally held above the level of the other rollers 4 of the conveyor 1 either by a spring or, as illustrated, by counterweights 50 on the sensor roller supports 49. The article sensors 19 may be positioned at any desired place in a zone depending upon the type of accumulation control and where it is desired that an article be stopped in a zone. In the illustrated conveyor 1, each article sensor roller 48 is positioned near the downstream end of the associated zone (see FIGS. 1 and 2). As will be described more fully, each article sensor 19 is connected to one of the control rods 21 engaged with the clutch control pawl 20 of a zone, such as by connection to one of the sensor roller supports 49 of the article sensor 19. Each article sensor 19 may include a pivot spacer 51 and a cross brace 52 extending between the sensor roller supports 49.

Referring to FIGS. 4, 5, 6, and 10, each of the clutch control pawls 20 is an inverted, uneven channel shaped member having a top web 55, a short upstream leg 57, and a longer downstream leg 56 having the end 41 thereon. The pawl is slidably connected to a cross member 28 of a zone as by a slot 58 in the top web 55 thereof and a bolt 59 extending through the slot 58 and the cross member 28. The pawl is oriented such that it may be moved in a longitudinal direction with respect to the conveyor 1. The pawl is urged toward the stop position thereof (see zones 8 and 9 of FIG. 5) by a compression spring 60 which engages the clutch control pawl 20 and the cross member 28. In the stop position, the downstream end 41 of the leg 57 engages one of the projections 40 of the clutch control collar 39. The pawl is held in a drive position thereof (FIG. 6) by one of the control rods 21 extending to the pawl from the adjacent upstream and downstream zones.

Each of the control rods 21 has an in-zone abutment 63 at a downstream end thereof and an upstream abutment 64 at an upstream end thereof. The abutments 63 and 64 may be any type of arrangement which performs the desired function, such as a threaded nut, a shoulder, or the like. As is illustrated, the abutments 63 and 64 are pins pressed through apertures at the respective ends of the control rods 21. As shown in FIG. 6, the control rods 21 extending from the zones adjacent to a pawl slidably engage the pawl through respective apertures in the legs 56 and 57 thereof. The upstream abutment 64 of each rod is positioned on the downstream side of the downstream leg 57 of a pawl; while the in-zone abutment 63 of a rod is positioned on the downstream side of the upstream leg 56 of a pawl.

Each control rod 21 is connected to an associated article sensor 19 by a sensor link 66. Each illustrated control rod 21 includes two overlapping rod portions which are fixed by a U-bolt 67 of the associated sensor link 66. This allows for adjustment of the length of the rod to properly position the abutments 63 and 64 with respect to the pawls associated therewith. While the U-bolt connection is not a pivotal joint, the control rods 21 are flexible enough that no problems are encountered. With the associated article sensor 19 in its up or unengaged position, the control rod 21 connected thereto is moved to the right as viewed in FIG. 6 such that, in cooperation with the in-zone abutment 63 of the rod, the clutch control pawl 20 is moved against the force of the compression spring 60 to the drive position of the pawl. Further, the upstream abutment 64 of the rod is engaged with the downstream leg 57 of the pawl in the next upstream zone whereby the upstream pawl is also moved to the drive position thereof.

When an article engages and lowers the article sensor 19 of a zone, the in-zone abutment 63 is moved to the left, as viewed in FIG. 6 such that the compression spring 60 moves the pawl to the stop position thereof and drive is decoupled from the rollers of the zone whereby the article is stopped in the zone. At the same time the upstream abutment 64 of the rod is also moved to the left. Since the upstream pawl is held in the drive position by the control rod and article sensor in the upstream zone, drive is maintained to the rollers in the upstream zone. However, movement of the upstream abutment 64 conditions the upstream pawl for movement to the stop position thereof when an article engages the article sensor in the upstream zone. FIGS. 1 and 2 illustrate the manner in which articles 22 accumulate on the conveyor 1. FIGS. 4 and 5 illustrate the positions of the accumulation control components as the articles accumulate as in FIGS. 1 and 2. If a single article 22 is sent downstream on the conveyor 1, it will not stop until it enters an accumulation zone immediately upstream of a zone in which an article is stopped. However, if a plurality of articles is sent along the conveyor 1, when the lead article enters the accumulation section, the articles will be singulated, that is, the articles will be separated into a train of articles with approximately one zone length spacing between articles. This is the manner in which accumulation conveyors conventionally operate.

When the lead article 71 enters the most downstream or end zone 7 and engages a barrier 72 (FIG. 3) at the end 14 of the accumulation section, the article 71 will engage the article sensor 19 of the end zone 7 whereby drive will be decoupled from the rollers 4 in the end zone 7. As the article sensor roller 48 is lowered, the control rod 21 connected thereto will be moved in a downstream direction whereby the pawl 20 in the end zone 7 will be urged toward engagement with the clutch control collar 39 of the end zone 7. At the same time, the upstream abutment 64 on the control rod 21 will be moved out of engagement with the clutch control pawl 20 in the next upstream zone 8. If an article is not engaging the article sensor 19 in the upstream zone 8, the pawl 20 therein will remain in its drive position, and drive will remain coupled in the upstream zone 8 until a subsequent article engages the article sensor in the upstream zone 8. Because the article sensor 19 is placed relatively late in each zone and because the sensor controls the coupling of the drive to the rollers in the same zone that the sensor is located in, the articles are stopped just as the front end of the article reaches the downstream boundary of the zones. Therefore, there is little space wasted in the accumulation section of the conveyor 1 according to the present invention.

The end zone 7 of the conveyor 1 is somewhat different from the other zones of the conveyor 1 since there is no zone downstream of end zone 7 to condition the decoupling mechanism in end zone 7. In the illustrated conveyor 1, the conditioning of end zone 7 is accomplished by a solenoid 74 (FIG. 3). The solenoid 74 includes a plunger 75 which is positioned to engage the clutch control pawl 20 in the end zone 7. The plunger 75 has a drive position in which it moves the clutch control pawl 20 in the end zone 7 to the drive position thereof; and similarly, the plunger 75 has a stop position in which it disengages from the pawl such that the position of the pawl is controlled by the position of the article sensor 19 in the end zone 7.

Preferably, the operation of the solenoid 74 is coordinated with the deployment of the barrier 72 such that the plunger 75 is placed in the stop position thereof when the barrier 72 is deployed whereby the end zone 7 is conditioned to decouple the drive therein when the barrier is deployed. The solenoid 74 provides a start-up mechanism for the conveyor 1. When it is desired to start the accumulated articles moving, the plunger 75 is placed in its drive position which urges the clutch control pawl 20 in end zone 7 against the compression spring 60 associated therewith to the drive position of the pawl. This releases the clutch control collar 39 whereby drive is recoupled to the rollers 4 of the end zone 7. When the lead article 71 moves out of engagement with the article sensor 19 in the end zone 7, the upstream zone 8 is reactivated, and the process is repeated upstream along the accumulation section of the conveyor 1. Although not shown, the accumulation section of the conveyor 1 may connect with another conveyor at the downstream end 14 to convey the articles 22 to a another destination.

While certain forms of the present invention have been described and illustrated, it is not to be limited thereto except insofar as such limitations are included in the following claims.

What is claimed and desired to be secured by Letters Patent is as follows:

1. An accumulation conveyor arrangement comprising:
   (a) an elongated roller conveyor including a conveyor frame with a plurality of rollers supported thereon;
   (b) a downstream accumulation zone having a downstream roller;
   (c) an upstream accumulation zone having an upstream roller;
   (d) drive means;
   (e) upstream and downstream clutch means each operably connecting said drive means and a respective roller, each said clutch means having a clutch control member adapted for disengaging said clutch means when immobilized, each said clutch control member having engagement means;
   (f) upstream and downstream stop pawl means each slidable between a stop position engaging a respective clutch control member engagement means for immobilizing said clutch control member and a drive position disengaged from said engagement means;
   (g) upstream and downstream article sensors each positioned in a respective accumulation zone and adapted for engagement by an article on said roller;
   (h) upstream and downstream pawl control rods each interconnecting a respective pawl means and article sensor;
   (i) said upstream pawl control rod having downstream abutment means engaging said downstream pawl means whereby said downstream pawl means is adapted to move said downstream pawl control rod upon movement of said downstream pawl means to its stop position;
   (j) said downstream pawl control rod having an upstream end with upstream abutment means, said upstream abutment means being selectively disengaged from said upstream pawl means with said downstream pawl means in a stop position whereby said upstream pawl means is adapted to move to its stop position upon engagement of said upstream sensor by an article on said rollers; and
   (k) said downstream pawl means being held in the drive position thereof by said downstream abutment until said downstream sensor is engaged by an article on said rollers; and
   (l) biasing means engaging said upstream pawl means, said biasing means adapted to urge said upstream pawl means to its stop position.

2. The arrangement as set forth in claim 1 wherein:
   (a) said drive means includes a line shaft rotatably mounted on said conveyor and extending therealong.

3. The arrangement as set forth in claim 2 wherein:
   (a) said drive means includes upstream and downstream right angle gear units each drivingly interconnecting said line shaft means and a respective clutch means.

4. The arrangement as set forth in claim 3 wherein:
   (a) each said right angle drive includes an output shaft mounted transverse to said conveyor.

5. The arrangement as set forth in claim 4 wherein:
   (a) each said right angle gear unit includes a through shaft extending longitudinally to said conveyor; and
   (b) said line shaft means includes a line shaft segment interconnecting said through shafts.

6. The arrangement as set forth in claim 1 wherein:
   (a) each said roller includes a respective pulley;
   (b) each said clutch means includes a respective pulley; and
   (c) upstream and downstream belts each interconnecting respective roller and clutch pulleys.

7. The arrangement as set forth in claim 1 wherein:
   (a) each said zone includes a plurality of rollers; and
   (b) said drive means includes upstream and downstream drive belts each interconnecting said rollers in a respective zone.

8. The arrangement as set forth in claim 1 wherein:
   (a) each said clutch control member comprises a rotary clutch control collar having a plurality of said projections.

9. The arrangement as set forth in claim 1 wherein:
   (a) each said biasing means comprises a spring receiving a respective pawl control rod.

10. The arrangement as set forth in claim 1 including:
    (a) a plunger in said downstream zone operably connected to said downstream pawl for moving said downstream pawl to its drive position.

* * * * *